United States Patent [19]
DiSimone

[11] Patent Number: 6,146,125
[45] Date of Patent: Nov. 14, 2000

[54] DYNAMIC MOLD SEAL

[75] Inventor: John DiSimone, Woodbridge, Canada

[73] Assignee: Husky Injection Molding Systems Ltd., Canada

[21] Appl. No.: 09/290,327

[22] Filed: Apr. 12, 1999

Related U.S. Application Data

[60] Provisional application No. 60/083,028, Apr. 24, 1998.

[51] Int. Cl.[7] .................................................. B29C 45/64
[52] U.S. Cl. ........................... 425/546; 425/810; 264/1.33
[58] Field of Search ...................... 425/546, 810, 425/589, 450.1; 264/106, 1.33

[56] References Cited

U.S. PATENT DOCUMENTS

| | | | |
|---|---|---|---|
| 5,092,759 | 3/1992 | Lichtinger et al. ...................... | 425/546 |
| 5,427,520 | 6/1995 | Shimizu et al. ......................... | 425/556 |
| 5,720,994 | 2/1998 | Asai .......................................... | 425/556 |
| 5,804,229 | 9/1998 | Asai .......................................... | 425/556 |

FOREIGN PATENT DOCUMENTS

| 352114 | 5/1991 | Japan . |
|---|---|---|
| 6304969 | 11/1994 | Japan . |

*Primary Examiner*—Harold Pyon
*Assistant Examiner*—Donald Heckenberg
*Attorney, Agent, or Firm*—Bachman & Lapointe, P.C.

[57] ABSTRACT

A dynamic mold seal for a mold having two relatively movable mold halves is provided. The dynamic mold seal is formed by a sealing ring mounted or secured to a first one of the mold halves. The sealing ring includes a rigid ring portion and a sealing portion including a flexible sealing member for preventing leakage of the pressurized molten material from the mold and thereby preventing the creation of flash about the molded article. The flexible sealing member is preferably formed by a reduced cross section portion of the sealing portion.

29 Claims, 4 Drawing Sheets

DYNAMIC MOLD SEAL

CROSS-REFERENCE TO RELATED APPLICATION(S)

This application claims the benefit of U.S. Provisional Application No. 60/083,028, filed Apr. 24, 1998.

BACKGROUND OF THE INVENTION

The present invention relates to a dynamic mold seal for use in an injection molding machine, which seal prevents leakage of molten material at the parting line between the molds. The dynamic mold seal of the present invention has particular utility in molding systems for manufacturing compact discs (CDS), digital video discs (DVDs), thinwall containers, and other thinwall articles.

Sometimes during injection, a separation occurs at the parting line between the mold halves. For example, when the force of the injected molten material acting on the surfaces of the core and cavity in opposing directions exceeds a counteracting clamping force exerted by the molding machine, separation can and will occur along the mold parting line. The effect of such separation is the leakage of the pressurized molten material and a resulting undesirable thin film of additional material, known as flash, around the perimeter of the molded article.

There are times however during molding when mold parting line separation occurs intentionally, for example when special processing techniques such as injection-compression are used to reduce molded-in stress in the parts or for example when a pure compression technique is used.

It is known in the prior art to employ a perimeter ring at the parting line to prevent leakage. U.S. Pat. No. 5,720,994 to Asai is illustrative of such an arrangement. The perimeter ring is attached to either the mold core face or the mold cavity face. The ring floats on either a guiding diameter or on pins, and is usually spring loaded away from the mold half to which it is attached. It is restricted to a certain travel or protrusion above the parting line by bolts, tapers or other devices. The ring maintains firm contact with the mating parting line face during mold filling.

To ensure sealing, this prior art arrangement relies on precise alignment of three pieces: the movable mold half, the stationary mold half, and the perimeter ring that slides over their surfaces. Over several million injection cycles, the ring is subject to wear and to seizure or sticking of the ring against the locating surface. If seizure occurs, the ring does not reside in the proper position, and mold flash can result. Misalignment, or non-concentricity, may also occur due to differential thermal expansion between the ring and the core and cavity surfaces.

SUMMARY OF THE INVENTION

Accordingly, it is an object of the present invention to provide a dynamic mold seal which prevents leakage of the pressurized molten material within a mold cavity during times when there is a separation at the mold parting line.

It is a further object of the present invention to provide a dynamic mold seal as above which avoids the need for precise clearance and which reduces the number of sliding pieces.

It is still a further object of the present invention to provide a dynamic mold seal as above which is not adversely impacted by differential thermal expansion effects.

It is yet a further object of the present invention to provide a dynamic mold seal as above which maintains concentricity with the mold.

It is yet a further object of the present invention to provide an improved method for forming a molded article.

The foregoing objects are attained by the dynamic mold seal and method of the present invention.

In accordance with the present invention, a seal for a mold formed by two mold halfs comprises a stationary sealing ring mounted to a first one of the mold halfs, which sealing ring includes means for allowing the mold halfs to separate slightly while molten material is being injected into the mold and preventing leakage of pressurized molten material from the mold, thereby preventing the creation of flash about the article being molded within the mold. The sealing ring includes a rigid ring portion and a sealing portion having the flexible sealing means for preventing leakage of the pressurized molten material from the mold and thereby preventing the creation of flash about the molded article. The flexible sealing means is preferably formed by a reduced cross section portion of the sealing portion which abuts against an outer surface of a portion of the article being fabricated and which abuts against an insert, such as a stamper, associated with the second mold half.

In a first embodiment of the present invention, the rigid ring portion is connected to the first one of the mold halves and the sealing portion with the flexible sealing means is formed by a separate member which mates with the rigid ring portion. In a second embodiment of the present invention, the rigid ring portion and the sealing portion with the flexible sealing means are a one-piece, integral construction. If desired, the sealing ring may be provided with one or more grooves for venting gases generated during the injection of the molten material into the mold cavity space formed by the mold halfs.

In operation, the flexible sealing means protrudes above the parting line of the first one of the mold halves to which it is mounted. The amount of protrusion of the flexible sealing means is determined by the amount of expected mold separation during injection. As the first and second mold halves are brought together prior to injection, the protruding flexible sealing means makes contact with the opposite mold half and flexes as the mold continues to close, thus providing a seal for preventing leakage of the molten material, such as a molten plastic resin material, and the creation of flash.

The dynamic mold seal of the present invention offers a number of advantages. For example, it maintains concentricity with the mold because it is pre-aligned and rigidly attached to either the mold core or the mold cavity half. Further, it is immune to differential thermal expansion effects due to the flexible nature of the flexible sealing means. The dynamic mold seal of the present invention may be used in situations where the first and second mold halfs are open slightly during injection, as for example, during the venting of trapped gas.

In accordance with the present invention, an improved method for forming a molded article comprises the steps of: providing a first mold half having at least one of a means for forming a molded article and a mold cavity and a second mold half having at least one of a means for forming a molded article and a mold cavity; providing a sealing ring having a flexible member; mounting the sealing ring to a first one of the mold halfs so that the flexible member protrudes above a mold parting line of the first one of the mold halfs; causing movement of at least one of the mold halfs towards the other of the mold halfs until the flexible member contacts a portion of the second one of the mold halfs so as to create a positive seal between the mold halfs; continuing said movement of said at least one of the mold halfs until the mold halfs contact each other and thereby causing the flexible member to flex toward the first one of the mold halfs while maintaining the positive seal; injecting molten material under pressure into a mold cavity space formed by the mold halfs when the mold halfs are in contact with each other; and allowing the mold halfs to separate slightly so as to vent gases from the mold cavity space during the injecting step, while the flexible member maintains contact with the portion of the second one of the mold halfs during the separation so as to maintain the positive seal.

Other details of the dynamic mold seal and method of the present invention, as well as further objects and advantages attendant thereto, are set forth in the following detailed description and the accompanying drawings in which like reference numerals depict like elements.

DETAILED DESCRIPTION OF THE PREFERRED EMBODIMENT(S)

Figure 1:
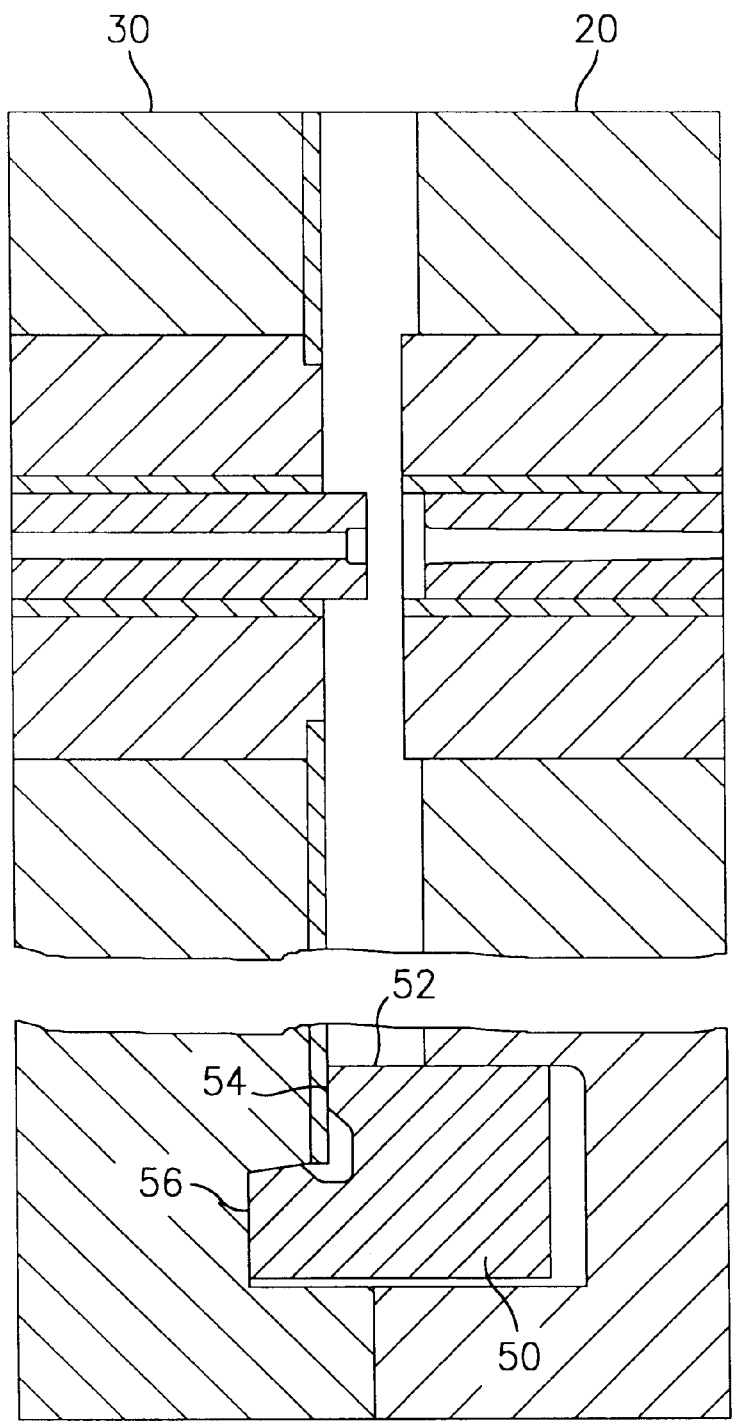
FIG. 1 is a sectional view of a prior art molding system.

Referring now to the drawings, FIG. 1 illustrates a prior art molding system having a stationary mold half 20 and a movable mold half 30 which is used in molding compact discs (CDs) or digital video discs (DVDs). In this system, an information carrier plate called a stamper is mounted to the movable mold half 30. A perimeter ring 50 is shown for providing a seal when the mold halfs 20 and 30 are separated during injection. As can be seen from this figure, the ring 50 has a number of surfaces 52, 54 and 56 that slide on surfaces of the cavity and core mold halfs. Over time, the surfaces 52, 54 and 56 wear and the ring 50 no longer provides an effective seal.

Figure 2A:
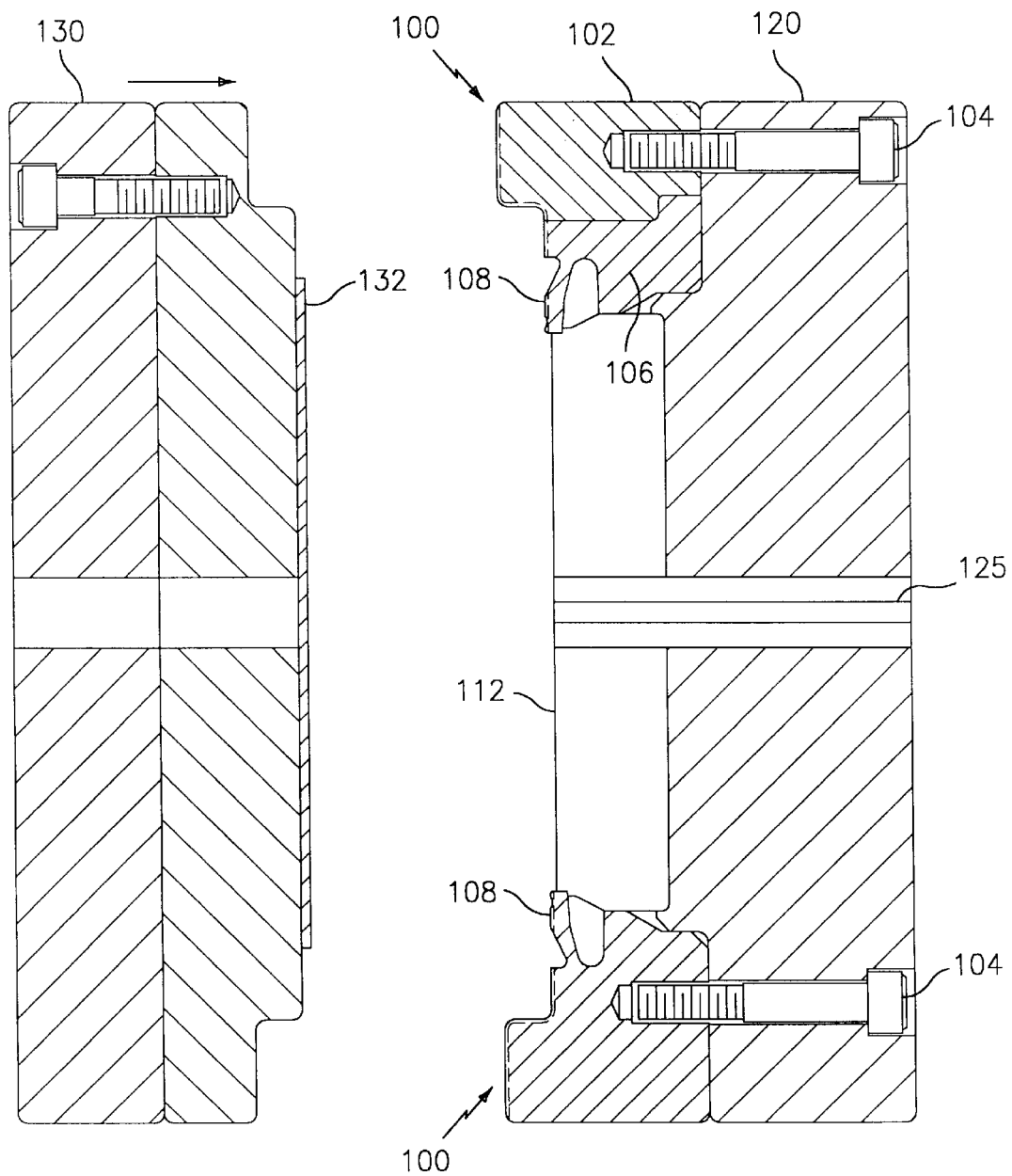
FIG. 2a is a sectional view of a molding system having the dynamic mold seal of the present invention while the molding system is in a mold open position.
Figure 2B:
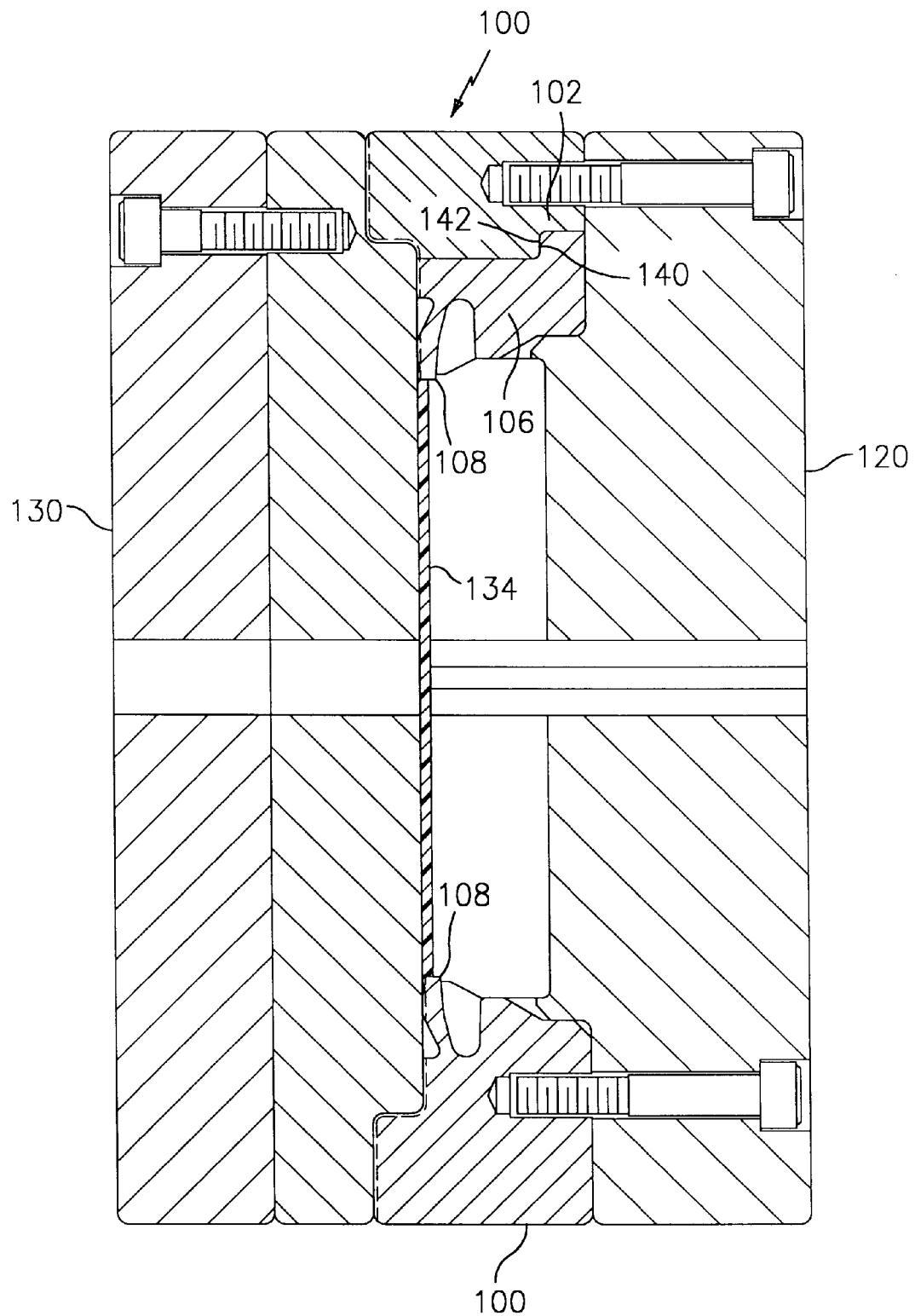
FIG. 2b is a sectional view of a molding system having the dynamic mold seal of the present invention while the molding system is in a mold closed position.
Figure 3:
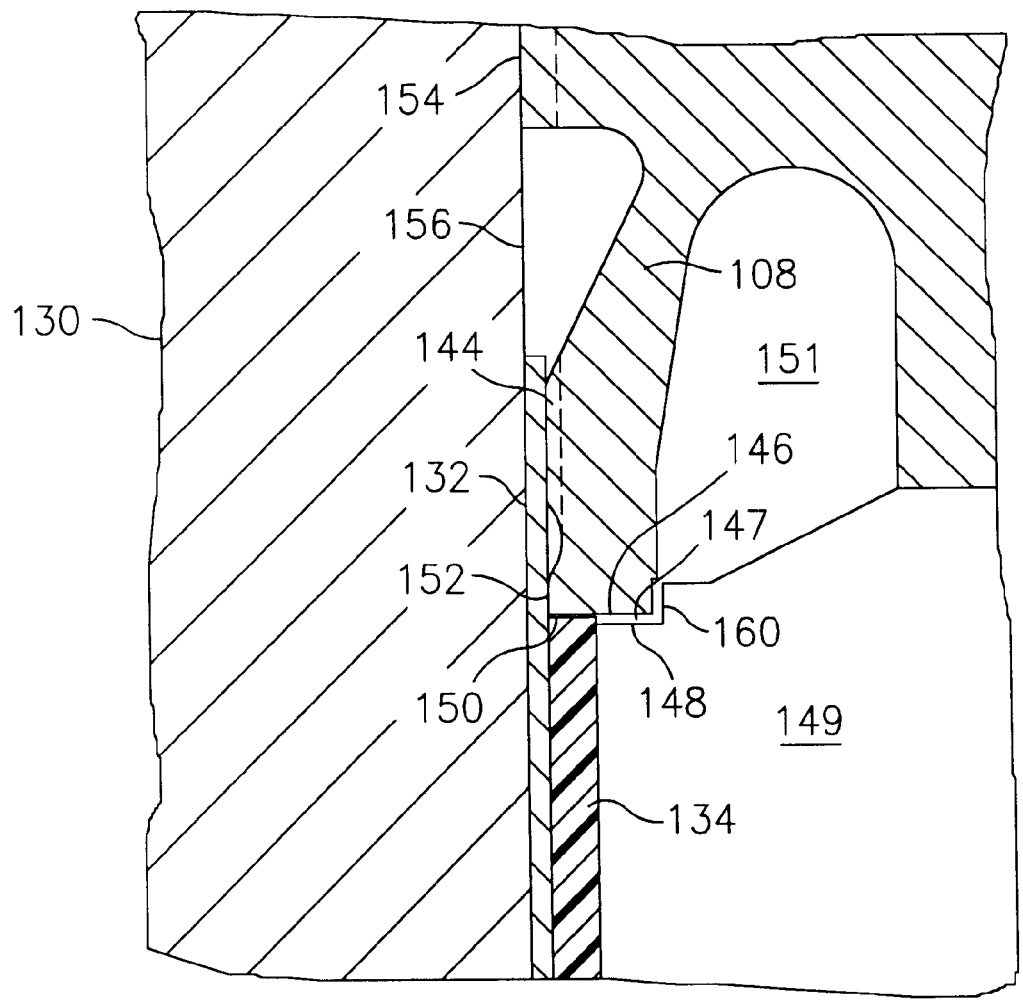
FIG. 3 is an enlarged section view of a portion of the molding system of FIGS. 2a and 2b.

FIGS. 2a, 2b & 3 illustrate the dynamic mold seal of the present invention. The dynamic mold seal may be used with any injection molding system which includes two relatively movable mold halfs 120 and 130. The mold half 120 preferably comprises a mold cavity portion, while the mold half 130 preferably comprises a mold core portion. Both mold halfs may be movable or alternatively one of the mold halfs, such as mold half 120, may be stationary and the other mold half, such as mold half 130, movable relative to the stationary mold half. In a closed position, the mold halfs 120 and 130 define a mold cavity space (not shown) in the shape of the article 134 to be molded. A sprue hole 125 is provided for injecting molten material, such as molten plastic resin material, into the cavity space when the mold halfs 120 and 130 are in a mold closed position.

The molding system depicted in FIGS. 2a, 2b and 3 includes means (not shown) for moving the mold halfs 120 and 130 between mold open and mold closed positions. The moving means do not form part of the present invention and therefore have not been described in detail. The moving means may comprise any suitable conventional moving means known in the art such as piston-cylinder units. The molding system also includes means for exerting an axial force known as a clamping force between the mold halfs 120 and 130 to compress the mold halfs. This axial force is needed to prevent the mold from springing open when the molten material is injected under high pressure, typically 3000 psi and higher, into the mold cavity space. The axial force exerting means also does not form part of the present invention and therefore has not been described in detail. The axial force exerting means may comprise any suitable conventional axial force exerting or clamping force applying means known in the art.

When forming a disc-like article, such as a CD or a DVD, the mold cavity has a projected total surface area perpendicular to the axis along which the axial force is exerted, substantially equal to the disc-shaped area. The total force exerted on the mold by the molten material is typically between 28,000 and 30,000 kg (approximately 30 tons). Such a large outward force must be counteracted by the axial force exerting means if the mold is to remain closed during injection.

The means for exerting the axial force to compress the two mold halfs 120 and 130 together is capable of exerting different magnitudes of compression. In the first stage of injection, the axial force is held to a lower magnitude. This first axial force is less than the product of the injection pressure and the total surface area. In other words, the injected molten material exerts a greater force than the means for exerting the axial force. As a result, the mold formed by the mold halfs 120 and 130 opens slightly along the parting line 112. The means for exerting the axial force however is designed such that the spacing between the mold halfs 120 and 130 is increased only slightly, and the amount of molten material injected is not excessive. The molten material batch inside the mold cavity space is, at this stage of the process, slightly thicker than the finished molded article will be.

The mold half 120 also has means (not shown) for ejecting a molded article 134 from the injection molding machine. The ejection means do not form part of the present invention and therefore have not been described in detail. Any suitable conventional ejection means known in the art may be provided.

The mold core half 130 may carry an insert 132, such as a stamper, for fabricating the molded article 134. When present, the stamper may comprise any suitable stamper known in the art and may be joined to the mold core half 130 in any desired manner.

The molding system includes a dynamic mold seal in the form of a sealing ring 100 positioned circumferentially about the outer periphery of the mold cavity space. The sealing ring 100 may have any desired configuration and will typically conform to the outer configuration of the mold cavity space. When disc-shaped articles such as CDs or DVDs are being molded, the sealing ring 100 is positioned adjacent the outer disc diameter, e.g. 120 mm. for CDs and DVDs. As will be described hereinafter, the sealing ring 100 is designed to allow the mold halfs 120 and 130 to separate slightly during injection while preventing leakage of the molten material within the mold cavity space.

The sealing ring 100 has a rigid ring portion 102 which is intimately connected to the mold half 120 such as by bolt 104. The sealing ring 100 further includes a sealing portion 106 for preventing the leakage of the molten material and the creation of flash. The sealing portion 106, when the mold halves are in an open position, has a flexible sealing member 108 which protrudes above the parting line 112 of the mold half 120. As shown at the bottom of FIGS. 2a and 2b, the sealing ring 100 may be one integral or unitary piece which includes both the rigid ring portion 102 and the sealing portion 106. Alternatively, as shown as the top of FIGS. 2*a* and 2*b,* the rigid ring portion 102 and the sealing portion 106 may be separate pieces. If the rigid portion 102 and the sealing portion 106 are separate pieces, they may be joined together in any desired manner. For example, they may be joined together by providing the sealing portion 106 with a shoulder 140 and the rigid portion 102 with a shoulder 142 which abuts against the shoulder 140 and thereby holds the sealing portion 106 in position.

As previously mentioned and as shown in FIG. 3, the sealing portion 106 includes a flexible sealing member 108 with a reduced cross section which renders the member 108 sufficiently flexible to effect a seal when the mold halfs 120 and 130 are slightly separated during injection of the molten material into the mold cavity space. If desired, the reduced cross section member 108 may be provided with one or more vent grooves 144 for allowing gases within the mold to vent while the mold halfs 120 and 130 are slightly separated during injection as well as at other times during the molding operation. The vent grooves 144 are preferably sized to allow the gas to pass without allowing the higher viscosity molten material within the mold cavity space to pass. For example, the vent grooves 144 may have a depth of up to about 30 microns. In lieu of vent grooves, it is also possible to provide a small gap, on the order of about 10 to 30 microns, between the sealing ring 100 and the mold halves to allow gas to pass through but not the higher viscosity molten material within the mold.

As shown in FIG. 3, the cavity insert 149 is provided with a safety step 160 to prevent overflexing of member 108. The bottom surface 146 of the sealing member 108 abuts against an outer surface 150 of the article 134 being molded. The bottom surface 146 however is spaced from a surface 148 of the step portion 160 so as to create a circumferential gap 147. The circumferential gap 147 allows gas to pass into an annular or circumferential chamber 151, which gas is later withdrawn through a channel or exhaust holes (not shown) to the atmosphere or by a vacuum means (not shown). The gap 147 provides a vent of constant width, thereby ensuring that plastic cannot flash into it, and serves to allow limited free movement of the flexible sealing member 108. By limiting the movement of the member 108, overbending is avoided. Further, variations in part thickness are controlled, and the material is not overstressed.

Further as shown in FIG. 3, the sealing member 108 has a portion 152 which abuts against a portion of the insert 132. If desired, the sealing portion 106 also may have a surface 154 which abuts against the face 156 of the mold core half. In this way, the flexible sealing member 108 forms a positive seal with the insert 132 and the surface 150 of the molded article so as to prevent the leakage of molten material from the mold even though the mold halfs 120 and 130 are separated during injection and thereby prevent the creation of flash. The flexible sealing member 108 of the present invention is also capable of withstanding the tremendous radial forces associated with the molding operation without any significant loss of its sealing function.

If no insert or stamper is present, the portion 152 of the sealing member 108 may also abut against the face 156 of the mold core half.

The sealing ring 100 may be formed from any suitable material known in the art. A preferred material for the sealing ring 100 is a metallic material such as steel or INCONEL. If desired, the rigid ring portion 102 and the sealing portion 106 may be formed from different materials such as different metals. Alternatively, when the sealing portion 106 is formed from a metallic material, that portion which forms the flexible sealing member 108 may be heat treated to a particular temper, such as a spring temper.

After injection of the molten material has been completed, the means for exerting an axial force on the mold halfs increases the applied axial force to close the mold. The molded article 134 is then allowed to cool within the mold. The mold halfs 120 and 130 may each be provided with conventional cooling circuits (not shown) for cooling the molded article 134. Thereafter, the mold is opened by releasing the axial force being applied and moving the mold halfs relative to each other. Finally, the molded article 134 is ejected from the mold using the ejection means (not shown).

As can be seen from the foregoing description, the sealing ring 100 of the present invention is a stationary ring that is held rigidly in place at the mold parting line and has no sliding surfaces between the sealing member and the mold core and cavity surfaces. As a result, it does not suffer from the same wear problems as prior art seals. The sealing ring 100 of the present invention is further advantageous in that it allows adjustment of the mold thickness during injection of the molten material into the mold.

The flexible sealing member 108 of the ring 100 is designed to protrude above the parting line 112 of the mold to which it is fastened, with the amount of protrusion being determined by the amount of expected mold separation during injection. As the mold halves are brought together prior to injection, the protruding flexible sealing member makes contact with the opposite mold half and flexes as the mold continues to close, providing a positive seal to prevent leakage of the molten material and the creation of flash.

The sealing ring 100 maintains concentricity with the mold because it is pre-aligned and rigidly attached to either the mold core or mold cavity side. Further, the sealing ring of the present invention is immune to differential thermal expansion effects as a result of the flexible nature of the sealing member 108.

While the mold half 120 preferably comprises a mold cavity portion and the mold half 130 preferably comprises a mold core portion, the dynamic mold seal of the present invention would work equally well if mold half 120 is a mold core portion and mold half 130 is a mold cavity portion.

In accordance with the present invention, an improved method for forming a molded article comprises the steps of: providing a first mold half 120 having at least one of a means for forming a molded article and a mold cavity and a second mold half 130 having at least one of a means for forming a molded article and a mold cavity; providing a sealing ring 100 having a flexible member 108; mounting the sealing ring 100 to a first one of the mold halfs 120 so that the flexible member 108 protrudes above a mold parting line 112 of the first one of the mold halfs; causing movement of at least one of the mold halfs towards the other of the mold halfs until the flexible member 108 contacts a portion of the second one of the mold halfs so as to create a positive seal between the mold halfs; continuing said movement of said at least one of the mold halfs until the mold halfs contact each other and thereby causing the flexible member to flex toward the first one of the mold halfs while maintaining the positive seal; injecting molten material under pressure into a mold cavity space formed by the mold halfs 120 and 130 when the mold halfs 120 and 130 are in contact with each other; and allowing the mold halfs 120 and 130 to separate slightly so as to vent gases from the mold cavity space during the injecting step, while the flexible member 108 maintains contact with the portion of the second one of the mold halfs during the separation so as to maintain the positive seal. The positive seal maintained by the flexible member 108 prevents any leakage of molten material from the mold cavity space. The positive seal is created in part by the flexible member 108 contacting an outer space 150 of the molded article. This substantially prevents the creation of flash. The method of the present invention further comprises venting gases from the mold cavity space via at least one groove 144 in the flexible member 108 or via a gap formed between the sealing ring 100 and one of the mold halfs 120 or 130 or via a gap 147 into an annular space 151 for later withdrawal.

It is apparent that there has been provided in accordance with the present invention a dynamic mold seal which meets the objects, means and advantages set forth hereinbefore. While the invention has been described by reference to specific embodiments thereof, it is evident that many alternatives, variations, and modifications may be become apparent to those skilled in the art. It is intended to embrace such alternatives, variations, and modifications which fall within the scope of the present invention.

What is claimed is:

1. A seal for a mold formed by two mold halfs, said seal comprising:

a sealing ring mounted to a first one of said mold halfs; and said sealing ring comprising a first stationary ring portion mounted to a surface of said first one of said mold halfs and a flexible portion joined to said first stationary ring portion, said flexible portion being located inwardly of said first stationary ring portion and on said first one of said mold halfs, said flexible portion allowing said mold halfs to separate slightly while molten material is being injected into said mold and preventing leakage of pressurized molten material from said mold, thereby preventing the creation of flash about an article being molded within said mold.

2. A seal according to claim 1, wherein said first one of said mold halfs has a mold parting line, said first stationary ring portion is held rigidly and concentrically in place at said mold parting line, and said flexible portion has no sliding surfaces so as to substantially reduce wear on said flexible portion.

3. A seal according to claim 1, further comprising said first one of said mold halfs having a mold parting line and said flexible portion being formed from a flexible member which protrudes above said parting line so that said flexible member can contact a portion of a second one of said mold halfs when said second one of said mold halfs is spaced from said first one of said mold halfs.

4. A seal according to claim 3, wherein said portion of said second one of said mold halfs comprises a stamper used to fabricate said molded article and said flexible member contacts said stamper when said first and second ones of said mold halfs are slightly spaced apart.

5. A seal according to claim 3, wherein said first stationary ring portion includes a rigid ring portion affixed to said first one of said mold halfs and a sealing ring portion which mates with said rigid ring portion and wherein said sealing ring portion includes said flexible member.

6. A seal according to claim 5, wherein said sealing ring portion has a first width and said flexible member has a second width less than said first width which allows said flexible member to flex as said mold halfs move towards and away from a mold closed position.

7. A seal according to claim 5, wherein said rigid ring portion and said sealing ring portion comprise an integral one-piece unit.

8. A seal according to claim 5, wherein said rigid ring portion is separate from said sealing ring portion.

9. A seal according to claim 8, wherein said rigid ring portion contains means for positioning said sealing ring portion against said rigid ring portion.

10. A seal according to claim 9, wherein said positioning means comprises a shoulder on said rigid ring portion for abutting a mating shoulder on said sealing ring portion.

11. A seal according to claim 5, wherein said first one of said mold halfs has a mold cavity and said sealing ring portion has a configuration which corresponds to the configuration of the outer periphery of said mold cavity.

12. A seal according to claim 5, wherein said rigid ring portion and said sealing rigid portion are formed from a metallic material.

13. A seal according to claim 1, further comprising means for venting gases from said mold formed by said mold halfs incorporated into said flexible portion.

14. A seal according to claim 13, wherein said venting means comprises at least one groove within said flexible portion.

15. A seal according to claim 14, wherein each said groove is sized to allow said gases to pass without allowing higher viscosity molten material within a mold cavity space defined by said mold halfs to pass.

16. A seal according to claim 13, wherein said venting means comprises a gap between the sealing ring and a second one of said mold halves.

17. A seal according to claim 1, further comprising said first one of said mold halfs having a mold cavity and said flexible portion having a first surface which abuts against an outer surface of said article being molded while said first surface is spaced from a surface of a safety step portion so as to create a gap through which gases vent.

18. A seal according to claim 17, further comprising an annular chamber communicating with said gap for collecting said vented gases for later withdrawal.

19. A seal according to claim 17, wherein said safety step portion limits travel of said flexible portion while said flexible portion is abutted against said outer surface of said molded article and against a portion of a second one of said mold halfs so as to prevent overbending and ensure variations in molded article thickness are controlled.

20. A seal for a mold formed by two mold halfs, said seal comprising:

a sealing ring mounted to a first one of said mold halfs;

said sealing ring comprising a first ring portion mounted to a surface of said first one of said mold halfs and a flexible portion joined to said first ring portion, said flexible portion being located inwardly of said ring portion and allowing said mold halfs to separate slightly while molten material is being injected into said mold and preventing leakage of pressurized molten material from said mold, thereby preventing the creation of flash about an article being molded within said mold;

said first one of said mold halfs having a mold parting line and said flexible portion being formed from a flexible member which protrudes above said parting line so that said flexible member can contact a portion of a second one of said mold halfs when said second one of said mold halfs is spaced from said first one of said mold halfs;

said first stationary ring portion including a rigid ring portion affixed to said first one of said mold halfs and a sealing ring portion which mates with said rigid ring portion and said sealing ring portion including said flexible member;

said rigid ring portion and said sealing ring portion being formed from a metallic material; and said flexible member being formed from a metallic material which has been heat treated to a spring temper.

21. An injection molding machine comprising:

a first mold half having at least one of a means for forming a molded article and a mold cavity;

a second mold half having at least one of a means for forming a molded article and a mold cavity;

at least one of said first and second mold halfs being movable between a mold open and a mold closed position;

means for injecting molten material into a mold cavity space formed by said mold halfs when said mold halfs are in said mold closed position;

sealing means for allowing said mold hafts to separate slightly while said molten material is being injected into said mold cavity space and for preventing leakage of said molten material from said mold cavity space;

said sealing means comprising a sealing ring mounted to one of said mold halfs;

said sealing ring including a first stationary ring portion and a flexible member both mounted to said one of said mold halfs, said flexible member preventing said leakage even though said mold halfs are slightly separated;

said one of said mold halfs having a parting line;

said sealing ring being held rigidly in place at said mold parting line; and said flexible member protruding above said parting line so that said flexible member contacts a portion of the mold half to which the sealing ring is not mounted when said mold halfs are slightly from each other.

22. An injection molding machine according to claim 21, further comprising:

said first stationary ring portion comprising a rigid ring portion and said sealing ring further including a sealing ring portion which mates with said rigid ring portion; and said flexible member forming a portion of said sealing ring portion.

23. An injection molding machine according to claim 22, wherein said sealing ring portion has a first width and said flexible member has a second width less than said first width which allows said flexible member to flex as at least one of said mold halfs moves relative to the other of said mold halfs.

24. An injection molding machine according to claim 22, wherein said sealing ring portion has a configuration which conforms to the configuration of the outer periphery of said mold cavity space.

25. An injection molding machine according to 22, wherein said rigid ring portion and said sealing ring portion are each formed from a metallic material.

26. An injection molding machine according to claim 21, further comprising means for venting gases from said mold cavity space during molten material injection.

27. An injection molding machine according to claim 26, wherein said venting means comprises at least one groove within said flexible member, said at least one groove being sized to allow said gases to pass without allowing molten material to pass.

28. An injection molding machine according to claim 26, wherein said venting means comprises a gap between a portion of said sealing rings and one of said mold halfs.

29. An injection molding machine according to claim 26, wherein said venting means comprises a circumferential gap between a surface of said sealing rings and a safety step portion and an annular chamber communicating with said gap for collecting said vented gases for later withdrawal.

* * * * *

UNITED STATES PATENT AND TRADEMARK OFFICE
CERTIFICATE OF CORRECTION

PATENT NO : 6,146,125
DATED : November 14, 2000
INVENTOR(S) : DiSimone

It is certified that error appears in the above-identified patent and that said Letters Patent are hereby corrected as shown below:

Column 9, claim 21, line 22, "hafts" should read --halfs--
Column 10, claim 28, line 32, "rings" should read --ring--
Column 10, claim 29, line 35, "rings" should read --ring--

Signed and Sealed this

Twenty-ninth Day of May, 2001

Attest:

NICHOLAS P. GODICI

*Attesting Officer*    *Acting Director of the United States Patent and Trademark Office*